United States Patent
Wan et al.

(10) Patent No.: US 8,186,222 B2
(45) Date of Patent: May 29, 2012

(54) CENTRIFUGAL FORCE SENSING DEVICE AND REACTION SYSTEM ON CENTRIFUGAL FORCE

(75) Inventors: Shian Wan, Hsinchu County (TW); Yuan-Shi Liao, Kaohsiung (TW); Chun-Ting Lee, Taipei (TW); Yao-Yuan Chang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 408 days.

(21) Appl. No.: 12/487,654

(22) Filed: Jun. 19, 2009

(65) Prior Publication Data

US 2010/0162814 A1    Jul. 1, 2010

(30) Foreign Application Priority Data

Dec. 31, 2008 (TW) ............................... 97151900 A
Mar. 23, 2009 (TW) ............................... 98109397 A

(51) Int. Cl.
*G01P 3/18* (2006.01)
(52) U.S. Cl. ....................................................... 73/535
(58) Field of Classification Search .................... 73/535, 73/536–537, 540–551
See application file for complete search history.

(56) References Cited

U.S. PATENT DOCUMENTS

| | | | | |
|---|---|---|---|---|
| 1,033,248 A * | 7/1912 | Johnson | ........................... | 73/535 |
| 3,110,186 A * | 11/1963 | Griffen | ........................... | 73/535 |
| 3,632,922 A * | 1/1972 | Baumoel | ..................... | 200/80 R |
| 4,143,551 A * | 3/1979 | Onitsuka | .......................... | 73/535 |
| 4,790,278 A * | 12/1988 | Schlosser et al. | ............. | 123/379 |
| 4,916,953 A * | 4/1990 | Lie | ................................... | 73/535 |
| 6,196,048 B1 * | 3/2001 | Kunimi | .......................... | 73/1.38 |

FOREIGN PATENT DOCUMENTS

| | | |
|---|---|---|
| JP | 31-8838 | 10/1956 |
| JP | 37-28832 | 10/1962 |
| JP | 43-15753 | 7/1968 |
| JP | 52102776 | 8/1977 |
| JP | 53-59871 | 5/1978 |
| JP | 61-98491 | 5/1986 |
| JP | 09-304230 | 11/1997 |

(Continued)

OTHER PUBLICATIONS

"Office Action of Japan Counterpart Application", issued on Jan. 31, 2012, p. 1-p. 4.

(Continued)

*Primary Examiner* — Helen C. Kwok
(74) *Attorney, Agent, or Firm* — Jiang Chyun IP Office

(57) ABSTRACT

A centrifugal force sensing device is disclosed, which includes a first rotating shaft, two first movable and two first fixing sleeves, a first and a second weight, two first and two second linkages, a restoration element, a first sensing unit for sensing centrifugal force, and two fixers. The two first movable sleeves are disposed through the first rotating shaft. The two first linkages are connected to the first weight and the two first movable sleeves. The restoration element having a fixing block and two first damping elements is disposed at the first rotating shaft. The two second linkages are connected to the second weight and the two first movable sleeves. The two first fixing sleeves are fixed at the first rotating shaft and respectively located between each of the two first movable sleeves and one of the two fixers.

27 Claims, 9 Drawing Sheets

FOREIGN PATENT DOCUMENTS

| | | |
|---|---|---|
| JP | 2008-149967 | 7/2008 |
| TW | 049051 | 2/1983 |
| TW | 050637 | 5/1983 |
| TW | 323380 | 12/1997 |
| TW | 342791 | 10/1998 |
| TW | 392605 | 6/2000 |
| TW | 441909 | 6/2001 |
| TW | 200303232 | 9/2003 |
| TW | M247447 | 10/2004 |
| TW | 200624387 | 7/2006 |
| TW | 200708485 | 3/2007 |
| TW | 200730239 | 8/2007 |
| TW | 200732487 | 9/2007 |

OTHER PUBLICATIONS

"Office Action of Taiwan Counterpart Application", issued on Mar. 16, 2012, pp. 1-5, in which the listed references were cited.

\* cited by examiner

CENTRIFUGAL FORCE SENSING DEVICE AND REACTION SYSTEM ON CENTRIFUGAL FORCE

CROSS-REFERENCE TO RELATED APPLICATION

This application claims the priority benefits of Taiwan patent application serial no. 97151900, filed on Dec. 31, 2008, and application serial no. 98109397, filed on Mar. 23, 2009. The entirety of each of the above-mentioned patent applications is hereby incorporated by reference herein and made a part of specification.

BACKGROUND OF THE INVENTION

1. Field of the Invention

The present invention generally relates to a sensing device and a reaction system, and more particularly, to a centrifugal force sensing device and a reaction system on centrifugal force.

2. Description of Related Art

In the prior art, a switch activated by centrifugal force is usually disposed in a rotating body, so that when the rotating body reaches a certain rotation speed to rotate, an action is activated. For example, in a device for automatically detecting tire pressure of a car fixed in the rim of the car, there is a switch activated by centrifugal force. When the car reaches a certain riding speed during driving, a device for detecting tire pressure of the car is automatically activated, so that the driver during high-speed riding is able to master the tire conditions in time to ensure driving safety. In more details, when the wheels of the car reach a preset rotation speed, the centrifugal force caused by the rotation is large enough to turn on the above-mentioned switch activated by centrifugal force and thereby to start the tire pressure detector. In this way, an automatic detection is automatically conducted.

FIG. 1A is a schematic view of a conventional switch activated by centrifugal force. Referring to FIG. 1A, an arched conductive spring strip 20 with two-stages is disposed in a switch body 10 of a conventional centrifugal switch. In normal status, the outwards-curved place of the conductive spring strip 20 with two-stages touches and props up a button 30. The top of the button 30 is protruded from the outline of the body 10 into a protrusion 31. A contact point 21 is disposed oppositely to the vertex of the arch portion of the conductive spring strip 20. The switch body 10 has a pressing rod 40 located outside the body 10, but the root portion of the pressing rod 40 is pivoted on a pivot 41 located oppositely to a side of the button 30. The body of the pressing rod 40 is tilted across the protrusion 31 of the button 30. A joining sheet 42 is disposed at the end of the pressing rod 40 and is roughly perpendicular to the body of the pressing rod 40. A thread hole 43 formed at the center of the joining sheet 42 is for connecting a weight block 50 through a bolt 51 of the weight block 50.

FIG. 1B is a schematic view showing the basic elements for detecting centrifugal force of FIG. 1A after a centrifugal force is applied thereon. Referring to FIGS. 1A and 1B, a conventional centrifugal switch is mounted on a tire or other rotating body and revolves along with the tire or the rotating body. During the revolving, the weight block 50 would drive the pressing rod 40 due to a centrifugal force, so that the pressing rod 40 swings around the pivot 41 and the body of the pressing rod 40 presses the protrusion 31 of the button 30. As a result, the button 30 contacts and presses the arched curve portion of the conductive spring strip 20. When the pressure force applied by the weight block 50 and the pressing rod 40 is increased with an increasing rotation speed to reach a preset threshold, the arched curve portion of the conductive spring strip 20 would encounter a bending instability and be sprung back into the second stage thereof. At the time, the upward arched curve portion touches the contact point 21 to turn on the switch, as shown in FIG. 1B.

Since, as the described above, the conventional centrifugal switch has on/off statuses only, so that a user is unable to obtain the information of centrifugal force in more details by means of the conventional centrifugal switch. In this regard, a novel centrifugal force sensing device needs to be developed.

SUMMARY OF THE INVENTION

Accordingly, the present invention is directed to a centrifugal force sensing device and a reaction system on centrifugal force, which are able to sense centrifugal force and to accordingly generate sensing information.

The present invention provides a centrifugal force sensing device, which includes a first rotating shaft, two first movable sleeves, a first weight, two first linkages, a restoration element, two first contact-based sensing elements, a second weight, two second linkages, two first fixing sleeves and two fixers. The two first movable sleeves are slidingly disposed on the first rotating shaft. The two first linkages respectively have a first end and a second end, wherein the first ends of the two first linkages are connected to the first weight, and the second ends of the two first linkages are respectively connected to the two first movable sleeves. The restoration element includes a fixing block and two first damping elements, wherein the fixing block is fixed at the first rotating shaft and located between the two first movable sleeves, and the two first damping elements are disposed at the first rotating shaft and respectively located between each of the two first movable sleeves and the fixing block. The two first contact-based sensing elements are respectively disposed at the two first linkages and located between the two first linkages for generating first sensing information. The two second linkages respectively have a first end and a second end, wherein the first ends of the two second linkages are connected to the second weight, and the second ends of the two second linkages are respectively connected to the two first movable sleeves. The two first fixing sleeves are fixed at the first rotating shaft and respectively located at the outer sides of the two first movable sleeves. The two fixers are fixed at the first rotating shaft and respectively located at the outer sides of the two first fixing sleeves.

The present invention also provides a reaction system on centrifugal force, which includes a centrifugal force sensing device and a reaction device on centrifugal force. The centrifugal force sensing device includes a first rotating shaft, two first movable sleeves, a first weight, two first linkages, a restoration element, two first contact-based sensing elements and a transmission element. The two first movable sleeves are slidingly disposed on the first rotating shaft. The two first linkages respectively have a first end and a second end, wherein the first ends of the two first linkages are connected to the first weight, and the second ends of the two first linkages are respectively connected to the two first movable sleeves. The restoration element includes a fixing block and two first damping elements, wherein the fixing block is fixed at the first rotating shaft and located between the two first movable sleeves. The two first damping elements are disposed at the first rotating shaft and respectively located between each of the two first movable sleeves and the fixing block. The two first contact-based sensing elements are respectively disposed at the two first linkages and located between the two first linkages for generating first sensing information. The transmission element is coupled to the two first contact-based sensing elements for transmitting the first sensing information. The reaction device on centrifugal force includes a reception element and a reaction element, wherein the reception element is coupled to the transmission element so as to receive the first sensing information, and the reaction element is coupled to the reception element so as to generate a reaction on motion according to the first sensing information.

The present invention further provides a centrifugal force sensing device, which includes a first rotating shaft, two first movable sleeves, a first weight, two first linkages, a restoration element, a second weight, two second linkages, two first fixing sleeves, two fixers, two first guiding rods and a first sensing unit. The two first movable sleeves are slidingly disposed on the first rotating shaft. The two first linkages respectively have a first end and a second end, wherein the first ends of the two first linkages are connected to the first weight, and the second ends of the two first linkages are respectively connected to the two first movable sleeves. For example, the first ends of the two first linkages may be connected with pins to the first weight, and the second ends of the two first linkages may be respectively connected to the two first movable sleeves with pins. The restoration element includes a fixing block and two first damping elements, wherein the fixing block is fixed at the first rotating shaft and located between the two first movable sleeves, and the two first damping elements are disposed at the first rotating shaft and respectively located between each of the two first movable sleeves and the fixing block. The two second linkages respectively have a first end and a second end, wherein the first ends of the two second linkages are connected to the second weight, and the second ends of the two second linkages are respectively connected to the two first movable sleeves. The two first fixing sleeves are fixed at the first rotating shaft and respectively located at the outer sides of the two first movable sleeves. The two fixers are fixed at the first rotating shaft and respectively located at the outer sides of the two first fixing sleeves. The two first guiding rods are respectively fixedly connected to the fixing block, wherein the two first guiding rods are substantially parallel to the first rotating shaft, and the two first movable sleeves are slidingly disposed on the two first guiding rods. The first sensing unit is for sensing the centrifugal forces applied on the first weight and the second weight so as to generate first sensing information.

The present invention further provides a reaction system on centrifugal force, which includes a centrifugal force sensing device and a reaction device on centrifugal force. The centrifugal force sensing device includes a first rotating shaft, two first movable sleeves, a first weight, two first linkages, a restoration element, a second weight, two second linkages, two first fixing sleeves, two fixers, two first guiding rods and a first sensing unit. The two first movable sleeves are slidingly disposed on the first rotating shaft. The two first linkages respectively have a first end and a second end, wherein the first ends of the two first linkages are connected to the first weight, and the second ends of the two first linkages are respectively connected to the two first movable sleeves. The restoration element includes a fixing block and two first damping elements, wherein the fixing block is fixed at the first rotating shaft and located between the two first movable sleeves, and the two first damping elements are disposed at the first rotating shaft and respectively located between each of the two first movable sleeves and the fixing block. The two second linkages respectively have a first end and a second end, wherein the first ends of the two second linkages are connected to the second weight, and the second ends of the two second linkages are respectively connected to the two first movable sleeves. The two first fixing sleeves are fixed at the first rotating shaft and respectively located at the outer sides of the two first movable sleeves. The two fixers are fixed at the first rotating shaft and respectively located at the outer sides of the two first fixing sleeves. The two first guiding rods are respectively fixedly connected to the fixing block, wherein the two first guiding rods are substantially parallel to the first rotating shaft, and the two first movable sleeves are slidingly disposed on the two first guiding rods. The first sensing unit is for sensing the centrifugal forces applied on the first weight and the second weight so as to generate first sensing information. The transmission element is coupled to the first sensing unit for transmitting the first sensing information. The reaction device on centrifugal force includes a reception element and a reaction element, wherein the reception element is coupled to the transmission element so as to receive the first sensing information, and the reaction element is coupled to the reception element so as to generate a reaction on motion according to the first sensing information.

The centrifugal force sensing device of the present invention is able to obtain the sensing information of centrifugal force, so that the centrifugal force sensing device is able to judge whether or not an object is rotating thereof according to the obtained sensing information and further calculate the speed of the rotation and determine the normal direction of the rotation plane. In addition, the reaction system on centrifugal force of the present invention is able to generate a reaction on motion to the user by means of the centrifugal force sensing device and the reaction device on centrifugal force.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
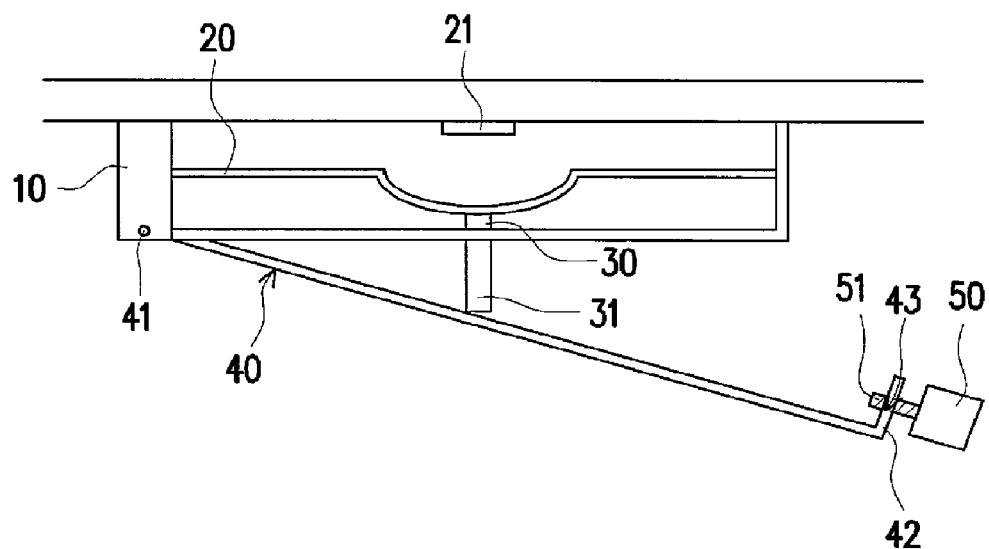
FIG. 1A is a schematic view of a conventional switch activated by centrifugal force.
Figure 1B:
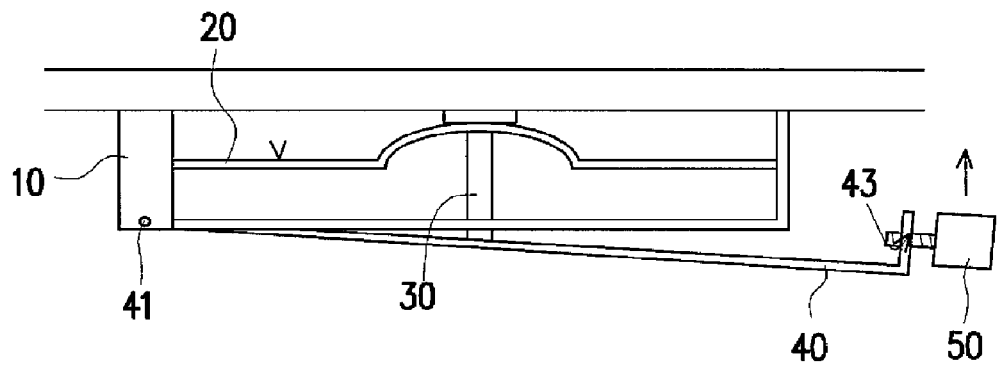
FIG. 1B is a schematic view of the switch activated by centrifugal force of FIG. 1A after a centrifugal force is applied thereon.

Reference will now be made in detail to the present embodiments of the invention, examples of which are illustrated in the accompanying drawings. Wherever possible, the same reference numbers are used in the drawings and the description to refer to the same or like parts.

Figure 2:
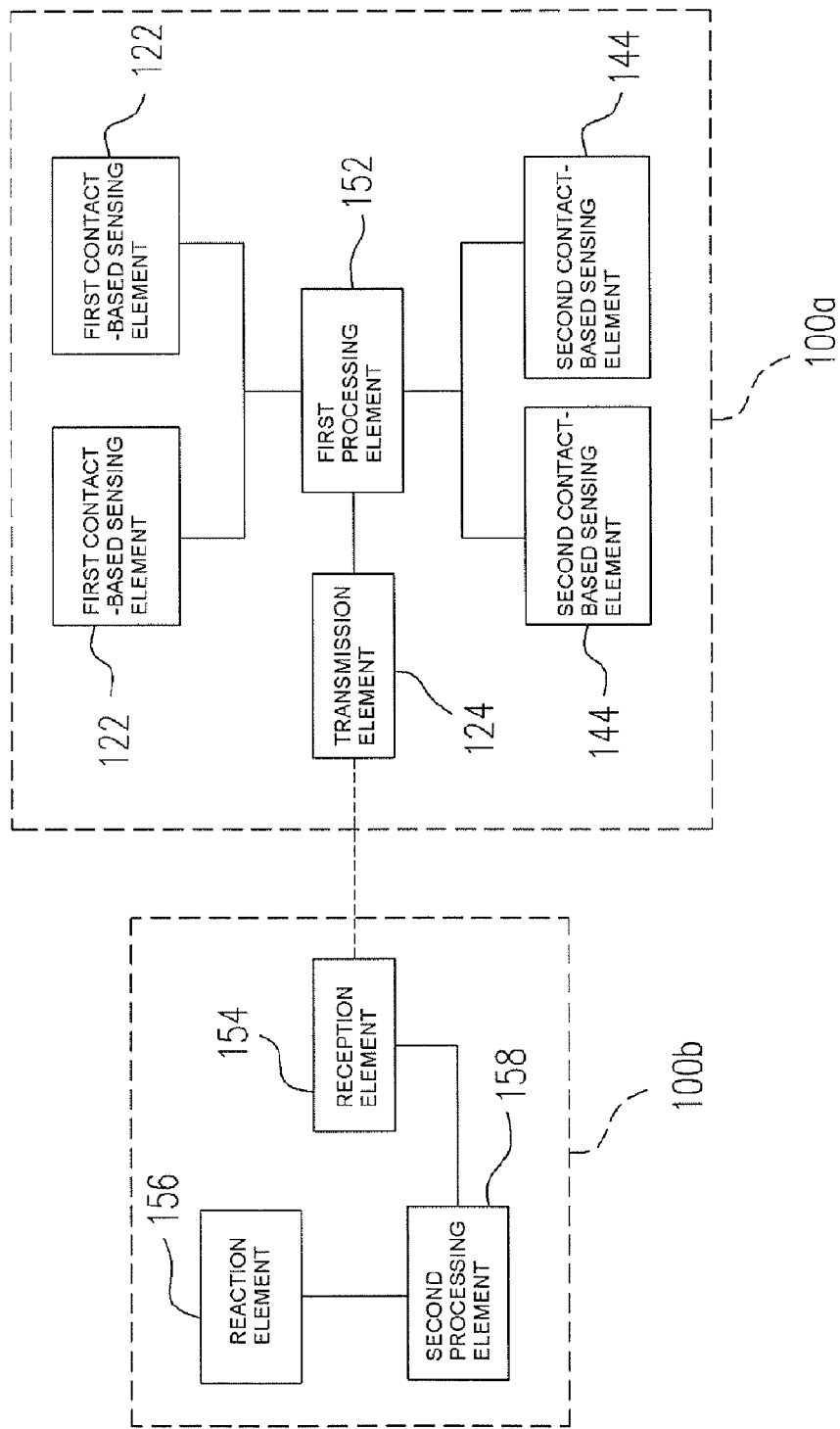
FIG. 2 is a block diagram of a reaction system on centrifugal force according to an embodiment of the present invention.

FIG. 2 is a block diagram of a reaction system on centrifugal force according to an embodiment of the present invention. Referring to FIG. 2, a reaction system 100 on centrifugal force includes a centrifugal force sensing device 100a and a reaction device 100b on centrifugal force. The centrifugal force sensing device 100a may be disposed in a rotating body, for example, a tire or a bowling, so as to obtain sensing information about centrifugal force. The reaction device 100b on centrifugal force then receives the sensing information from the centrifugal force sensing device 100a. After that, the reaction device 100b on centrifugal force generates a reaction on motion such as sound, light or image available to the user according to the sensing information.

Figure 3:
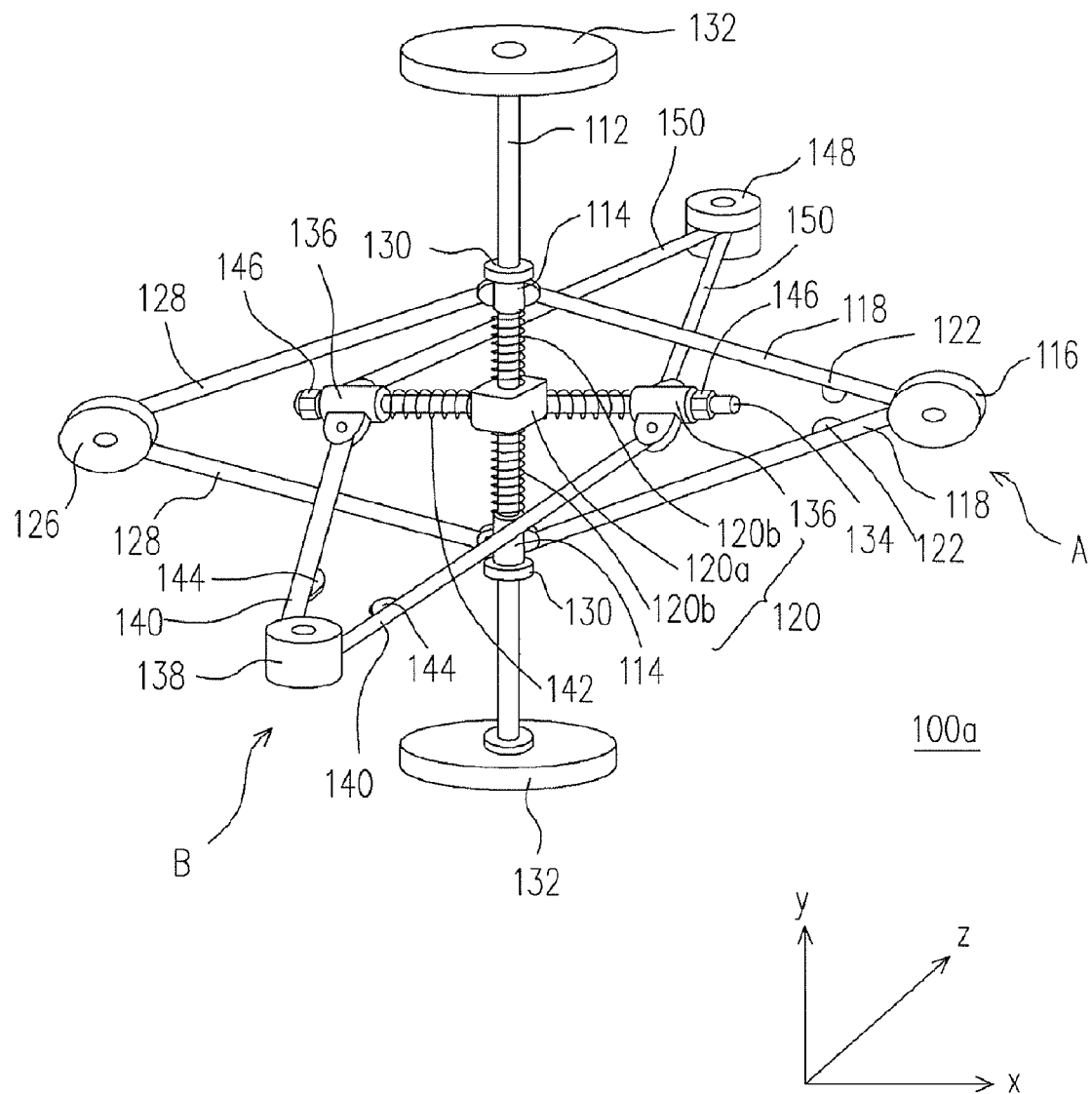
FIG. 3 is a schematic view of the centrifugal force sensing device of FIG. 2.

In more details, the centrifugal force sensing device 100a may include two first contact-based sensing elements 122, two second contact-based sensing elements 144, a first processing element 152 and a transmission element 124. The two first contact-based sensing elements 122, for example, are used to sense a centrifugal force applied on the rotating body rotating around the Y-axis and the Z-axis (as shown in FIG. 3) so as to generate first sensing information. Similarly, the two second contact-based sensing elements 144 may be used to sense a centrifugal force applied on the rotating body rotating around, the X-axis and the Y-axis (as shown in FIG. 3) so as to generate second sensing information. The first processing element 152 is in charge of processing the sensing information and coupled to the two first contact-based sensing elements 122 and the two second contact-based sensing elements 144 so as to calculate rotation information of the rotating body according to the first sensing information and the second sensing information. The transmission element 124 is coupled to the first processing element 152 and is, for example, a wireless transmitter.

In addition, the reaction device 100b on centrifugal force may include a reception element 154, a second processing element 158 and a reaction element 156. The reception element 154 is, for example, a wireless receiver and coupled to the transmission element 124 in wireless way so as to receive the first sensing information, second sensing information and rotation information of the centrifugal force sensing device 100a. The second processing element 158 is coupled to the reception element 154 for calculating the first sensing information, second sensing information and rotation information received by the reception element 154 so as to generate a corresponding control signal. The reaction element 156 is, for example, a display unit, a vibration unit or a vocalization unit, and reaction element 156 is coupled to the second processing element 158 so as to generate a reaction on motion such as sound, light or image available to the user according to the received control signal from the second processing element 158.

The reaction system 100 on centrifugal force is applicable in a bowling game, where the centrifugal force sensing device 100a may be fixed at the center of moment of inertia of the bowling for instantly judging whether or not the bowling in rolling status. Meanwhile, the reaction devices on centrifugal force 100b may be mounted in the pins so as to make the pins chattered, scream or emit light and so on according to the sensing result of the centrifugal force sensing device 100a. In more details, the first processing element 152 or the second processing element 158 may moreover estimate the rotation speed of the bowling (RPM) and the normal direction of the rotation plane thereof. During the rolling of the bowling, the reaction system 100 on centrifugal force may also predict the track of the moving bowling available to the user.

FIG. 3 is a schematic view of the centrifugal force sensing device of FIG. 2. Referring to FIGS. 2 and 3, the centrifugal force sensing device 100a has following structure. The centrifugal force sensing device 100a includes a first rotating shaft 112, two first movable sleeves 114, a first weight 116, two first linkages 118, a restoration element 120 and two first contact-based sensing elements 122. The first rotating shaft 112 is placed along a Y-axis direction and the first movable sleeves 114 are slidingly disposed on the first rotating shaft 112. The first ends of the two first linkages 118 are connected to the first weight 116, and the second ends of the two first linkages 118 are respectively connected to the two first movable sleeves 114.

In the embodiment, the centrifugal force sensing device 100a further includes two first fixing sleeves 130, which are fixed at the first rotating shaft 112 and respectively located at the outer sides of the two first movable sleeves 114 so as to define the sliding travels of the two first movable sleeves 114. The centrifugal force sensing device 100a also includes two fixers 132, which are fixed at the first rotating shaft 112 and respectively located at the outer sides of the two first fixing sleeves 130 for fixing the reaction system 100 on centrifugal force on the rotating body.

The restoration element 120 is disposed at the first rotating shaft 112 and located between the two first movable sleeves 114. In the embodiment, the restoration element 120 includes, for example, a fixing block 120a and two first damping elements 120b, wherein the two first damping elements 120b are respectively a spring. The fixing block 120a is fixed at the first rotating shaft 112 and located between the two first movable sleeves 114, and the two first damping elements 120b are respectively located between each of the two first movable sleeves 114 and the fixing block 120a. The two first contact-based sensing elements 122 are respectively disposed at the two first linkages 118 and located between the two first linkages 118. In an embodiment, the two first contact-based sensing elements 122 may be, for example, contacted by each other when a centrifugal force is applied, so as to sense the contact or the contact pressure amount to generate first sensing information.

The centrifugal force sensing device 100a further includes a second weight 126 and two second linkages 128. The two second linkages 128 respectively have a first end and a second end, wherein the first ends of the two second linkages 128 are connected to the second weight 126, and the second ends of the two second linkages 128 are respectively connected to the two first movable sleeves 114. When a centrifugal force is applied, the second weight 126 and the two second linkages 128 serve as a balance to the first weight 116 and the two first linkages 118, so that a better sensing effect of the two first contact-based sensing elements 122 can be achieved. In the embodiment, as described above, a basic component A for detecting centrifugal force is roughly composed of the first rotating shaft 112, the two first movable sleeves 114, the first weight 116, the two first linkages 118, the restoration element 120, the two first contact-based sensing elements 122, the second weight 126, the two second linkages 128 and the two first fixing sleeves 130.

Figure 4A:
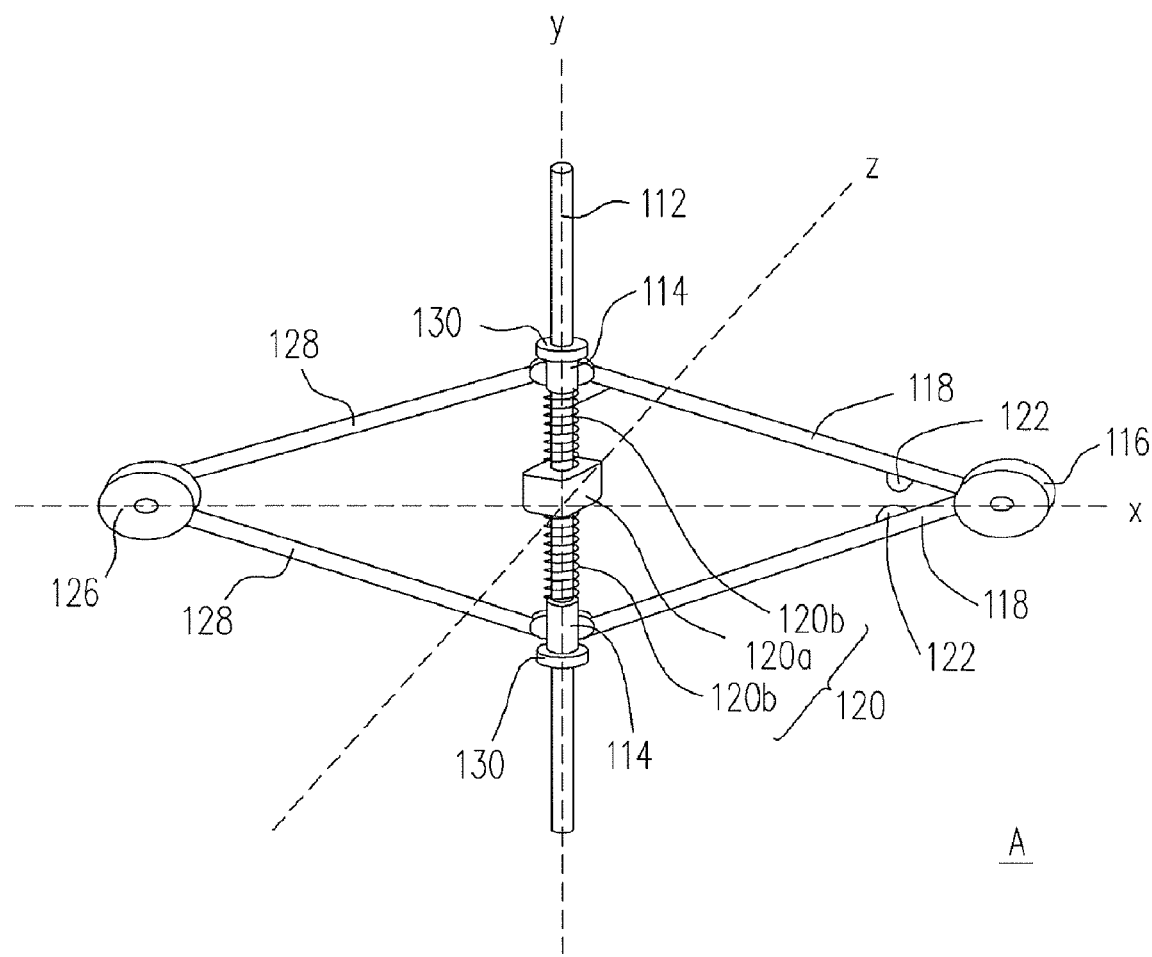
FIG. 4A is a schematic view showing the basic component for detecting centrifugal force in FIG. 3 in still status.
Figure 4B:
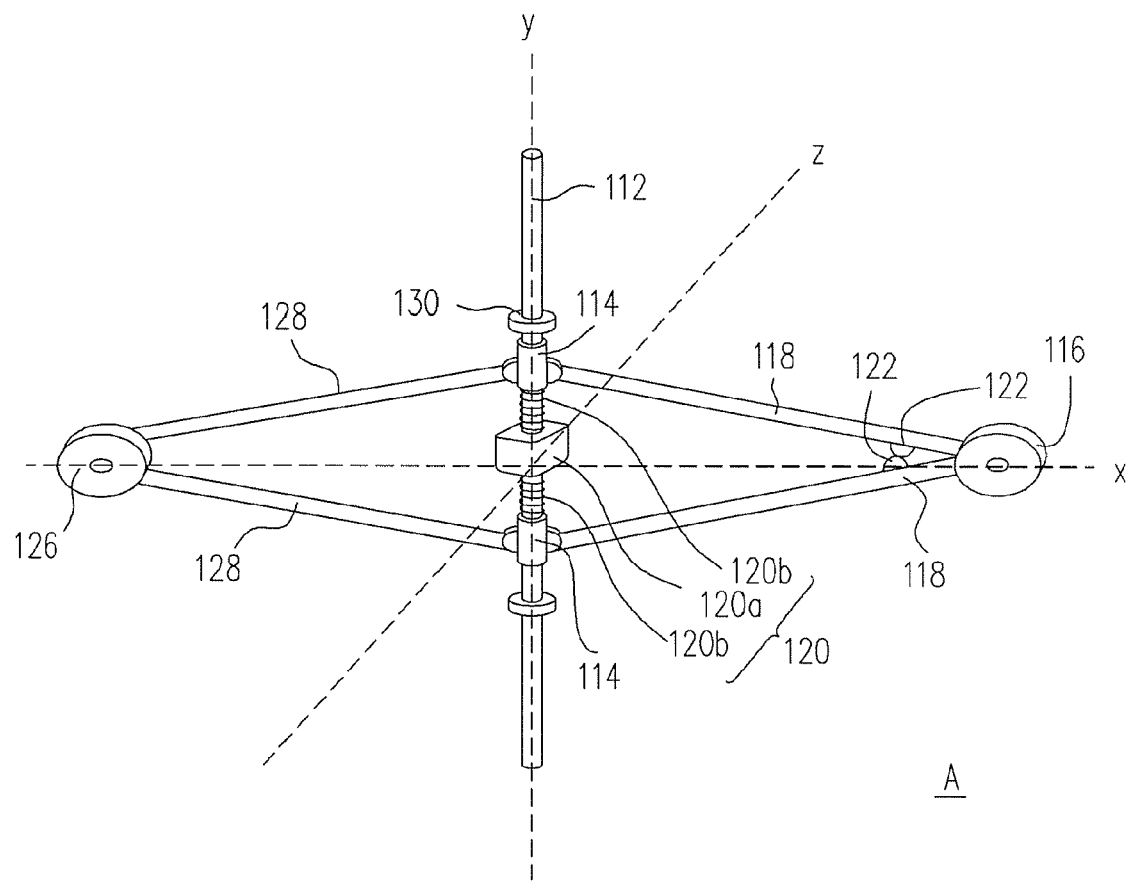
FIG. 4B is a schematic view showing the basic component for detecting centrifugal force of FIG. 4A after a centrifugal force is applied thereon.

FIG. 4A is a schematic view showing the basic component for detecting centrifugal force in FIG. 3 in still status and FIG. 4B is a schematic view showing the basic component for detecting centrifugal force of FIG. 4A after a centrifugal force is applied thereon. When the basic component A for detecting centrifugal force is rotating around the Y-axis, a course of sensing a centrifugal force by the two first contact-based sensing elements 122 can be explained in FIGS. 4A and 4B.

Referring to FIG. 4A, which is a schematic view of a basic component A for detecting centrifugal force, when two first movable sleeves 114 respectively contact the two first fixing sleeves 130 under the restoration forces of initial deformations of the two first damping elements 120b, all the parts of the basic component A for detecting centrifugal force take stable statuses and have the relative positions as shown by FIG. 4A. With the situation, the two first contact-based sensing elements 122 send back a signal of "no rotation" or even do not send back any signal.

Referring to FIGS. 4A and 4B, when the basic component A for detecting centrifugal force is rotating around the Y-axis, the first weight 116 and the second weight 126 start moving towards the two outer sides along the X-axis under the centrifugal force action. At the time, due to the moving of the first weight 116 and the second weight 126, the first linkage 118 and the second linkage 128 respectively pull the two first movable sleeves 114 to be approached by each other along the first rotating shaft 112. At a stable rotation speed, the centrifugal forces produced by the first weight 116 and the second weight 126 are equal to and balanced with the elastic deformation forces of the two first damping elements 120b. In this way, the relative positions of all the parts of the whole basic component A for detecting centrifugal force remain unchanged, and the two first contact-based sensing elements 122 send back first sensing information with an analog or a digital signal, wherein the signal depends on the positions of the two first contact-based sensing elements 122, i.e., the approaching conditions of the two first linkages 118. After that, the first sensing information is converted into a rotation speed of the rotating body through the first processing element 152 (as shown in FIG. 2). In an embodiment, the first sensing information may be generated by the first contact-based sensing elements 122 whenever the two elements 122 start contact each other or according to the contact pressure amount, and thereafter, the first sensing information is sent to the first processing element 152.

If, instead of the Y-axis, the basic component A for detecting centrifugal force rotates around the Z-axis in a stable speed, the two first contact-based sensing elements 122 can still work as the described above. That is, the two first contact-based sensing elements 122 send back first sensing information with an analog or a digital signal, wherein the signal depends on the positions of the two first contact-based sensing elements 122, i.e., the approaching extent of the two first linkages 118. In an embodiment, the first sensing information may be generated by the first contact-based sensing elements 122 whenever the two elements 122 start contact each other or according to the contact pressure amount, and thereafter, the first sensing information is sent to the first processing element 152.

Continuing to FIG. 3, for the rotation around the X-axis of the basic component A for detecting centrifugal force, the two first contact-based sensing elements 122 are unable to access each other to generate any first sensing information about the rotating body. To suit the rotation around the X-axis, the centrifugal force sensing device 100a may further include another basic component B for detecting centrifugal force. In more details, the basic component B for detecting centrifugal force includes a second rotating shaft 134, two second movable sleeves 136, a third weight 138, two third linkages 140, two second damping elements 142 and two second contact-based sensing elements 144.

The second rotating shaft 134 is disposed, for example, along the X-axis and is fixed at and passes through the fixing block 120a. In the embodiment, the second rotating shaft 134 is substantially perpendicular to the first rotating shaft 112. The two second movable sleeves 136 are slidingly disposed on the second rotating shaft 134, and the fixing block 120a is located between the two second movable sleeves 136. The two third linkages 140 respectively have a first end and a second end, wherein the first ends of the two third linkages 140 are connected to the third weight 138, and the second ends of the two third linkages 140 are respectively connected to the two second movable sleeves 136. The two second damping elements 142 are respectively disposed between each of the two second movable sleeves 136 and the fixing block 120a. The two second contact-based sensing elements 144 are respectively disposed at the two third linkages 140 and located between the two third linkages 140 for generating a second sensing information.

The basic component B for detecting centrifugal force further includes two second fixing sleeves 146 fixed at the second rotating shaft 134 and respectively located at the outer sides of the two second movable sleeves 136 so as to define the sliding travels of the two second movable sleeves 136. In addition, in the embodiment, the basic component B for detecting centrifugal force further includes a fourth weight 148 and two fourth linkages 150. The two fourth linkages 150 respectively have a first end and a second end, wherein the first ends of the two fourth linkages 150 are connected to the fourth weight 148, and the second ends of the two fourth linkages 150 are respectively connected to the two second movable sleeves 136.

In this way, the centrifugal force sensing device 100a is formed by two basic components A and B for detecting centrifugal force, which are arranged orthogonally as shown in FIG. 3. The centrifugal force sensing device 100a with the two basic components A and B is able to detect the second sensing information about the rotation of the rotating body rotating around the X-axis. Therefore, the centrifugal force sensing device 100a is not only able to judge whether or not an object is rotating but also calculate the rotation speed thereof as well as the normal direction of the rotation plane without any limitation of the rotation axis direction of the rotating body.

In more details, the centrifugal force sensing device 100a may be oriented to a direction (45° skewed direction) which causes weakest centrifugal forces to the basic components A and B for detecting centrifugal force. Under the above-mentioned orientation, the first until fourth weights (116, 126, 138 and 148), the two first damping elements 120b, the two second damping elements 142, the two first contact-based sensing elements 122 and the two second contact-based sensing elements 144 are adjusted to set a threshold. After that, whether or not the rotating body is rotating is judged by comparing the first sensing information provided by the first contact-based sensing elements 122 and the second sensing information provided by the second contact-based sensing elements 144 with the threshold.

After the corresponding first sensing information and second sensing information are sent back by the two first contact-based sensing elements 122 and two second contact-based sensing elements 144 of the basic components A and B for detecting centrifugal force, the first processing element 152

(as shown in FIG. 2) converts the information into the rotation speed of the rotating body and the normal direction of the rotation plane.

Figure 5A:
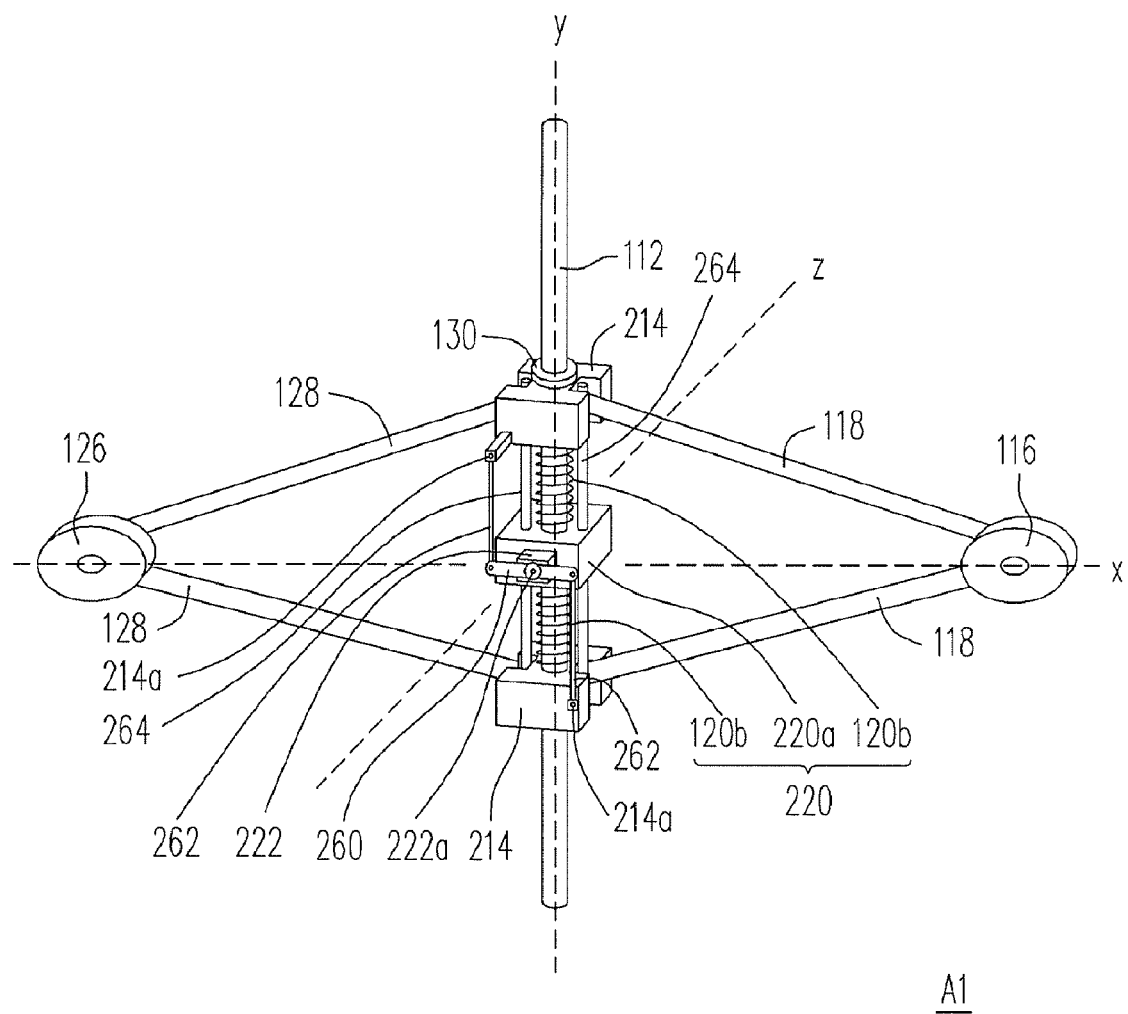
FIG. 5A is a schematic view showing the basic component for detecting centrifugal force in still status according to another embodiment of the present invention.

FIG. 5A is a schematic view showing the basic component for detecting centrifugal force in still status according to another embodiment of the present invention. Referring to FIGS. 4A and 5A, the embodiment of FIG. 5A is similar to that of FIG. 4A, and the similar parts in both the embodiments are marked with the same notations. For simplicity, the following depiction is focused on the differences, and the similar structures are omitted.

In terms of the two basic components A and A1 for detecting centrifugal force, the two first contact-based sensing elements 122 in FIG. 4A are replaced by a first sensing unit 222 in the embodiment. In addition, the embodiment has two additional first guiding rods 264. In the embodiment, the first sensing unit 222 is, for example, a first variable resistor and the first sensing unit 222 is fixed on a fixing block 220a of a restoration element 220. The first sensing unit 222 has a first adjustment portion 222a. When the first adjustment portion 222a is driven by an external force to rotate, the resistance of the first sensing unit 222 gets changed.

The basic component A1 for detecting centrifugal force further includes a first swing arm 260 and two first driving rods 262, and the two first movable sleeves 214 respectively have a fixing portion 214a. The first swing arm 260 is fixed at the adjustment portion 222a of the first sensing unit 222. The first ends of the two first driving rods 262 are respectively connected to the fixing portions 214a of the two first movable sleeves 214, and the second ends of the two first driving rods 262 are respectively connected to both ends of the first swing arm 260.

Figure 5B:
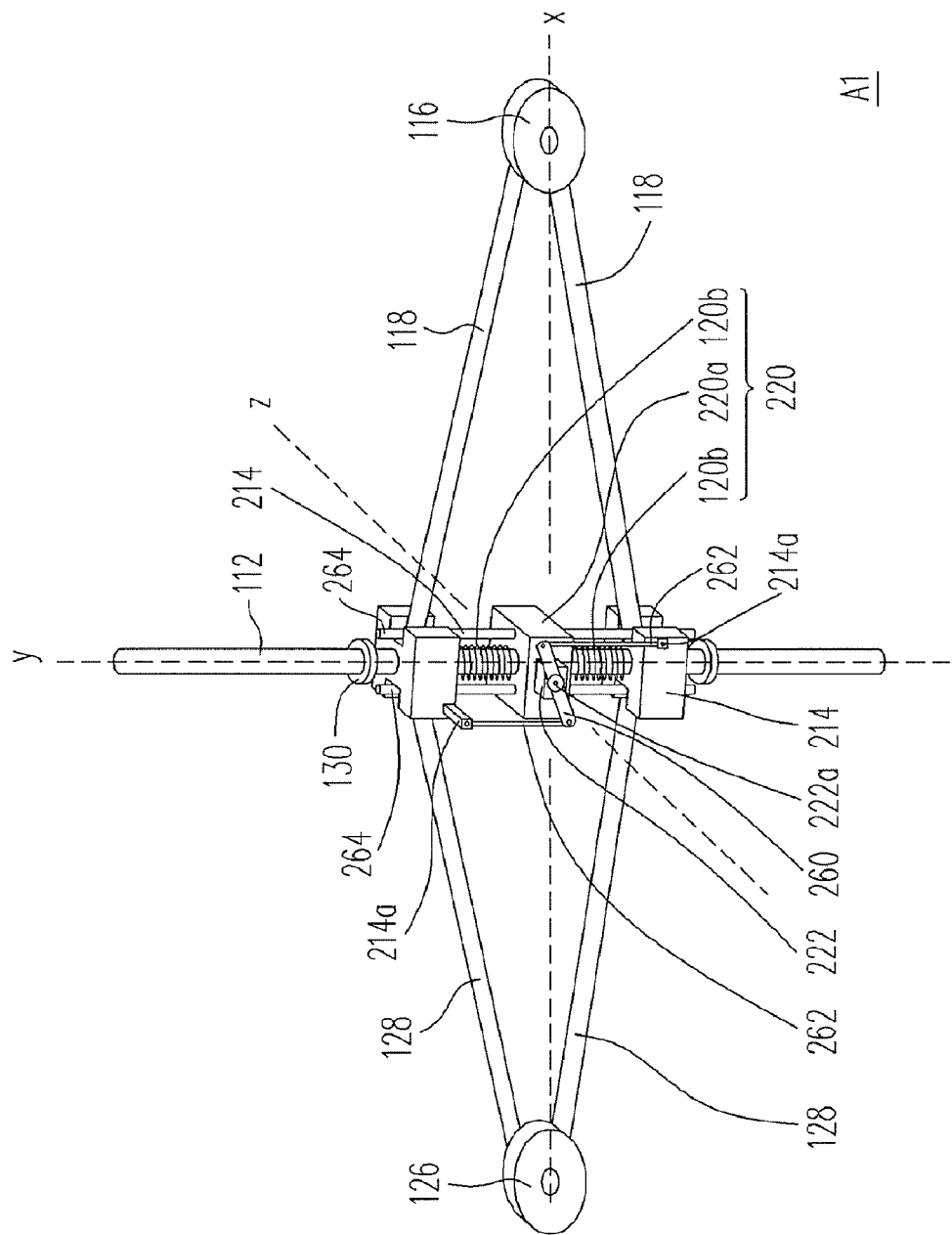
FIG. 5B is a schematic view showing the basic component for detecting centrifugal force of FIG. 5A after a centrifugal force is applied thereon.

FIG. 5B is a schematic view showing the basic component for detecting centrifugal force of FIG. 5A after a centrifugal force is applied thereon. Referring to FIGS. 5A and 5B, when the first weight 116 and the second weight 126 are subject to a centrifugal force, both the first weight 116 and the second weight 126 move along the X-axis departing from each other. Meanwhile, the first weight 116 and the second weight 126 respectively pull the two first linkages 118 and the two second linkages 128 to move, which makes the two first linkages 118 and the two second linkages 128 together with the two first movable sleeves 214 approach the fixing block 220a. During the two first movable sleeves 214 are approaching the fixing block 220a, the fixing portions 214a of the two first movable sleeves 214 drive the two first driving rods 262, so that the two first driving rods 262 together with the first swing arm 260 turn an angle anti-clockwise. At the time, the first adjustment portion 222a is pivoted synchronically with the first swing arm 260 such that the resistance of the first sensing unit 222 (first variable resistor) is varied. Namely, the larger the centrifugal force, the more the resistance varies. In this way, by measuring the variation of the resistance, the corresponding centrifugal force applied on the basic component A1 for detecting centrifugal force may be calculated, and the first sensing information about the centrifugal force is thereby obtained.

In another embodiment, the resistance of the first variable resistor in the first sensing unit 222 may be replaced by the two first contact-based sensing elements 122 of FIG. 4A, wherein the two first contact-based sensing elements 122 may be a switching unit with dry contact point which is used to judge whether or not the basic component A1 for detecting centrifugal force is subject to a centrifugal force only without considering the amount of the centrifugal force. The first sensing unit 222 is not limited to the above-mentioned contact implementation or variable resistor implementation. For example, the first sensing unit 222 may include an infrared distance sensing module mounted on the two first movable sleeves 214 to calculate the centrifugal force applied on the basic component A1 for detecting centrifugal force through sensing the variation of the distance between the two first movable sleeves 214. Besides, the first sensing unit 222 may be a pressure sensor as well, which is connected to one of the two second damping elements 142 to calculate the centrifugal force applied on the basic component A1 for detecting centrifugal force by sensing the pressure received by the one of the two second damping elements 142 or the restoration elastic force feedback thereon.

The basic component A1 for detecting centrifugal force further includes two first guiding rods 264. The two first guiding rods 264 are respectively fixed at the fixing block 220a and substantially perpendicular to the first rotating shaft 112. The two first movable sleeves 214 are slidingly disposed on the two first guiding rods 264. In assistance of the two first guiding rods 264, the two first movable sleeves 214 are preventing from rotating with respect to the first rotating shaft 112, which contributes to more accurate sense the centrifugal force by the first sensing unit 222. Certainly, the two first guiding rods 264 are also applicable in the basic component A for detecting centrifugal force of FIG. 4A for increasing the sensing accuracy.

Figure 6:
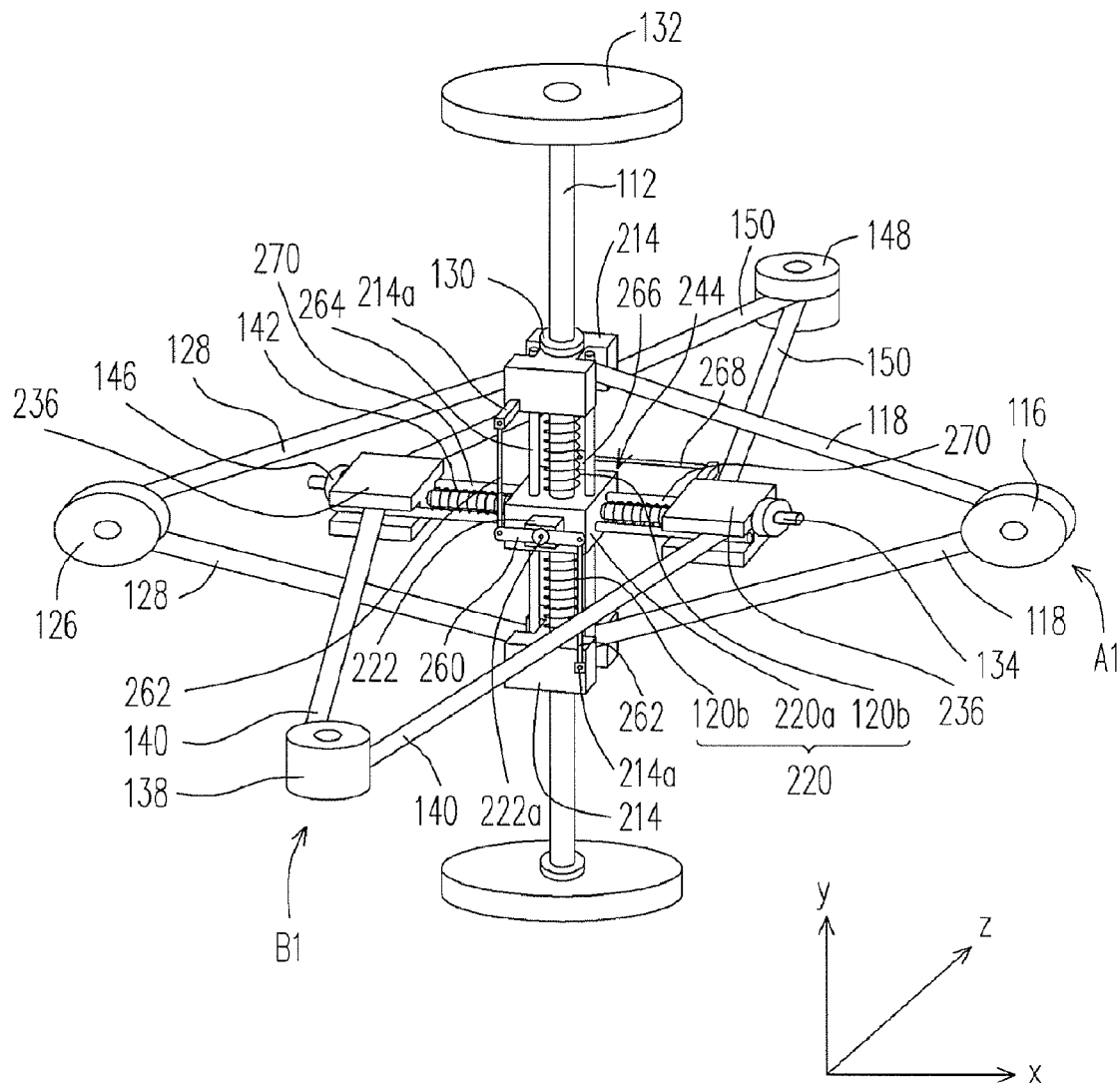
FIG. 6 is a schematic view of the centrifugal force sensing device employing the basic component for detecting centrifugal force of FIG. 5A.

FIG. 6 is a schematic view of the centrifugal force sensing device employing the basic component for detecting centrifugal force of FIG. 5A. Referring to FIGS. 5A an 6, although, as the described above, a single basic component A1 for detecting centrifugal force is able to simultaneously sense the centrifugal forces respectively along the Y-axis and the Z-axis, however, in a three-dimensional situation containing the X-axis, the Y-axis and the Z-axis, another basic component B1 for detecting centrifugal force is needed to entirely sense the centrifugal forces and the variations thereof. In the embodiment, the two basic components A1 and B1 for detecting centrifugal force may be orthogonally disposed so as to form a centrifugal force sensing device 200a able to sense three-dimensional centrifugal forces, where the second rotating shaft 134 is perpendicular to the first rotating shaft 112.

The architecture and the working principle of the basic component A1 for detecting centrifugal force is similar to that of the basic component B1 for detecting centrifugal force, which are omitted to describe. A first sensing unit 222 of the basic component A1 for detecting centrifugal force and a second sensing unit 244 of the basic component B1 for detecting centrifugal force (referring to FIG. 6) are disposed at the two opposite sides of the fixing block 220a. In the embodiment, the second sensing unit 244 may be a second variable resistor connected to the second swing arm 266. The second swing arm 266 is respectively connected to the two second movable sleeve 236 through two second driving rods 268 (only one is shown in FIG. 6). The basic component B1 for detecting centrifugal force further includes two second guiding rods 270, which are respectively fixed at the fixing block 220a and substantially parallel to the second rotating shaft 134. The two second movable sleeves 236 are slidingly disposed on the two second guiding rods 270.

Figure 7:
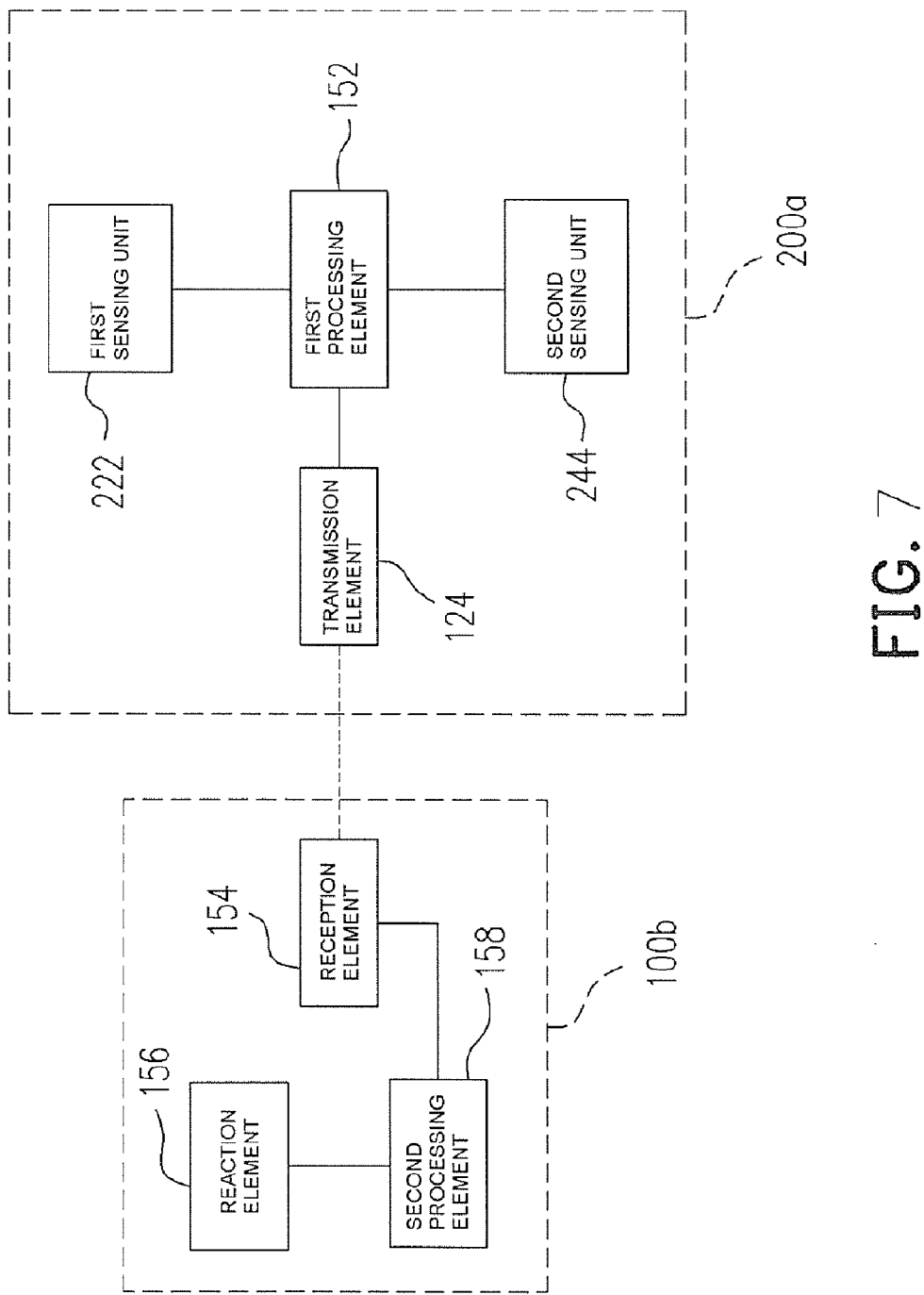
FIG. 7 is a block diagram of the reaction system on centrifugal force employing the centrifugal force sensing device of FIG. 6.

FIG. 7 is a block diagram of the reaction system on centrifugal force employing the centrifugal force sensing device of FIG. 6. Referring to FIGS. 7 and 2, the centrifugal force sensing device 200a and the reaction device 100b on centrifugal force of FIG. 2 together form another reaction system 200 on centrifugal force. After the first sensing unit 222 and the second sensing unit 244 respectively obtain the sensing information of centrifugal force, the reaction device 100b on centrifugal force receives the sensing information from the centrifugal force sensing device 200a. Then, the reaction device 100b on centrifugal force generates a reaction on motion such as sound, light or image available to the user according to the received sensing information. In another unshown embodiment, the centrifugal force sensing devices 100a and 200a may respectively include a vibration sensing unit, so that in addition to sensing centrifugal force, the vibration extent may be further sensed. After sensing a vibration, the reaction device 100b on centrifugal force is used to generate a reaction on motion to the user.

In summary, the centrifugal force sensing device of the present invention is able to obtain the sensing information of centrifugal force, so that the centrifugal force sensing device is able to judge whether or not an object is rotating thereof according to the obtained sensing information and further calculate the speed of the rotation and determine the normal direction of the rotation plane. In addition, the reaction system on centrifugal force of the present invention is able to generate a reaction on motion to the user by means of the centrifugal force sensing device and the reaction device on centrifugal force.

It will be apparent to those skilled in the art that various modifications and variations may be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A centrifugal force sensing device, comprising:
   a first rotating shaft;
   two first movable sleeves, slidingly disposed on the first rotating shaft;
   a first weight;
   two first linkages respectively having a first end and a second end, wherein the first ends of the two first linkages are connected to the first weight, and the second ends of the two first linkages are respectively connected to the two first movable sleeves;
   a restoration element, comprising a fixing block and two first damping elements, wherein the fixing block is fixed at the first rotating shaft and located between the two first movable sleeves, and the two first damping elements are disposed at the first rotating shaft and respectively located between each of the two first movable sleeves and the fixing block;
   two first contact-based sensing elements, respectively disposed at the two first linkages and located between the two first linkages for generating first sensing information;
   a second weight;
   two second linkages respectively having a first end and a second end, wherein the first ends of the two second linkages are connected to the second weight, and the second ends of the two second linkages are respectively connected to the two first movable sleeves;
   two first fixing sleeves, fixed at the first rotating shaft and respectively located at the outer sides of the two first movable sleeves; and
   two fixers, fixed at the first rotating shaft and respectively located at the outer sides of the two first fixing sleeves.

2. The centrifugal force sensing device as claimed in claim 1, further comprising:
   a second rotating shaft, disposed through the fixing block;
   two second movable sleeves, slidingly disposed on the second rotating shaft, wherein the fixing block is located between the two second movable sleeves;
   a third weight;
   two third linkages respectively having a first end and a second end, wherein the first ends of the two third linkages are connected to the third weight, and the second ends of the two third linkages are respectively connected to the two second movable sleeves;
   two second damping elements, respectively disposed between each of the two second movable sleeves and the fixing block;
   two second contact-based sensing elements, respectively disposed at the two third linkages and located between the two third linkages for generating second sensing information;
   two second fixing sleeves, fixed at the second rotating shaft and respectively located at the outer sides of the two second movable sleeves;
   a fourth weight; and
   two fourth linkages respectively having a first end and a second end, wherein the first ends of the two fourth linkages are connected to the fourth weight, and the second ends of the two fourth linkages are respectively connected to the two second movable sleeves.

3. The centrifugal force sensing device as claimed in claim 2, wherein the second rotating shaft is substantially perpendicular to the first rotating shaft.

4. A reaction system on centrifugal force, comprising:
   a centrifugal force sensing device, comprising:
      a first rotating shaft;
      two first movable sleeves, slidingly disposed on the first rotating shaft;
      a first weight;
      two first linkages respectively having a first end and a second end, wherein the first ends of the two first linkages are connected to the first weight, and the second ends of the two first linkages are respectively connected to the two first movable sleeves;
      a restoration element, comprising a fixing block and two first damping elements, wherein the fixing block is fixed at the first rotating shaft and located between the two first movable sleeves, and the two first damping elements are disposed at the first rotating shaft and respectively located between each of the two first movable sleeves and the fixing block;
      two first contact-based sensing elements, respectively disposed at the two first linkages and located between the two first linkages for generating first sensing information;
      a transmission element, coupled to the two first contact-based sensing elements for transmitting the first sensing information; and
   a reaction device on centrifugal force, comprising:
      a reception element, coupled to the transmission element so as to receive the first sensing information; and
      a reaction element, coupled to the reception element so as to generate a reaction on motion according to the first sensing information.

5. The reaction system on centrifugal force as claimed in claim 4, wherein the centrifugal force sensing device further comprises:
   a second rotating shaft, disposed through the fixing block;
   two second movable sleeves, slidingly disposed on the second rotating shaft, wherein the fixing block is located between the two second movable sleeves;
   a third weight;
   two third linkages respectively having a first end and a second end, wherein the first ends of the two third linkages are connected to the third weight, and the second ends of the two third linkages are respectively connected to the two second movable sleeves;

two second damping elements, respectively disposed between each of the two second movable sleeves and the fixing block;

two second contact-based sensing elements, respectively disposed at the two third linkages and located between the two third linkages for generating second sensing information.

6. The reaction system on centrifugal force as claimed in claim 5, wherein the second rotating shaft is substantially perpendicular to the first rotating shaft.

7. The reaction system on centrifugal force as claimed in claim 5, further comprising:

a first processing element, coupled to the two first contact-based sensing elements and the two second contact-based sensing elements for calculating rotation information according to the first sensing information and the second sensing information.

8. The reaction system on centrifugal force as claimed in claim 4, wherein the reaction element is one of a display unit, a vibration unit and a vocalization unit.

9. The reaction system on centrifugal force as claimed in claim 4, wherein the transmission element and the reception element are respectively a wireless transmitter and a wireless receiver.

10. A centrifugal force sensing device, comprising:

a first rotating shaft;

two first movable sleeves, slidingly disposed on the first rotating shaft;

a first weight;

two first linkages respectively having a first end and a second end, wherein the first ends of the two first linkages are connected to the first weight, and the second ends of the two first linkages are respectively connected to the two first movable sleeves;

a restoration element, comprising a fixing block and two first damping elements, wherein the fixing block is fixed at the first rotating shaft and located between the two first movable sleeves, and the two first damping elements are disposed at the first rotating shaft and respectively located between each of the two first movable sleeves and the fixing block;

a second weight;

two second linkages respectively having a first end and a second end, wherein the first ends of the two second linkages are connected to the second weight, and the second ends of the two second linkages are respectively connected to the two first movable sleeves;

two first fixing sleeves, fixed at the first rotating shaft and respectively located at the outer sides of the two first movable sleeves;

two fixers, fixed at the first rotating shaft and respectively located at the outer sides of the two first fixing sleeves;

two first guiding rods, respectively fixed at the fixing block, wherein the two first guiding rods are substantially parallel to the first rotating shaft, and the two first movable sleeves are slidingly disposed on the two first guiding rods; and a first sensing unit, for sensing a centrifugal forces applied on the first weight and the second weight so as to generate first sensing information.

11. The centrifugal force sensing device as claimed in claim 10, wherein the first sensing unit comprises two first contact-based sensing elements, wherein the two first contact-based sensing elements are respectively disposed at the two first linkages and located between the two first linkages.

12. The centrifugal force sensing device as claimed in claim 10, wherein the first sensing unit is disposed at a side of the fixing block and comprises a first variable resistor changing a resistance thereof by the movement of the two first movable sleeves.

13. The centrifugal force sensing device as claimed in claim 12, wherein the first variable resistor has a first adjustment portion for adjusting the resistance of the first variable resistor, and the centrifugal force sensing device further comprises:

a first swing arm, fixedly connected to the first adjustment portion; and two first driving rods having a first end and a second end, wherein the first ends of the two first driving rods are respectively connected to the two first movable sleeves, and the second ends of the two first driving rods are connected to the first swing arm.

14. The centrifugal force sensing device as claimed in claim 13, wherein each of the two first movable sleeves respectively has a fixing portion and the fixing portion is connected to the first end of one of the two first driving rods.

15. The centrifugal force sensing device as claimed in claim 10, further comprising:

a second rotating shaft, disposed through the fixing block;

two second movable sleeves, slidingly disposed on the second rotating shaft, wherein the fixing block is located between the two second movable sleeves;

a third weight;

two third linkages respectively having a first end and a second end, wherein the first ends of the two third linkages are connected to the third weight, and the second ends of the two third linkages are respectively connected to the two second movable sleeves;

two second damping elements, respectively disposed between each of the two second movable sleeves and the fixing block;

two second fixing sleeves, fixed at the second rotating shaft and respectively located at the outer sides of the two second movable sleeves;

a fourth weight;

two fourth linkages respectively having a first end and a second end, wherein the first ends of the two fourth linkages are connected to the fourth weight, and the second ends of the two fourth linkages are respectively connected to the two second movable sleeves;

two second guiding rods, respectively fixed at the fixing block, wherein the two second guiding rods are substantially parallel to the second rotating shaft, and the two second movable sleeves are slidingly disposed on the two second guiding rods; and a second sensing unit, for sensing a centrifugal forces applied on the third weight and the fourth weight so as to generate second sensing information.

16. The centrifugal force sensing device as claimed in claim 15, wherein the second sensing unit comprises two second contact-based sensing elements, wherein the two second contact-based sensing elements are respectively disposed at the two third linkages and located between the two third linkages.

17. The centrifugal force sensing device as claimed in claim 16, wherein the first sensing unit and the second sensing unit are respectively disposed at two opposite sides of the fixing block and the second sensing unit comprises a second variable resistor changing the resistance thereof by the movement of the two second movable sleeves.

18. The centrifugal force sensing device as claimed in claim 17, wherein the second variable resistor has a second adjustment portion for adjusting the resistance of the second variable resistor, and the centrifugal force sensing device further comprises:
- a second swing arm, fixedly connected to the second adjustment portion; and
- two second driving rods having a first end and a second end, wherein the first ends of the two second driving rods are respectively connected to the two second movable sleeves, and the second ends of the two second driving rods are connected to the second swing arm.

19. The centrifugal force sensing device as claimed in claim 18, wherein each of the two second movable sleeves respectively has a fixing portion and the fixing portion is connected to the first end of one of the two second driving rods.

20. The centrifugal force sensing device as claimed in claim 15, wherein the second rotating shaft is substantially perpendicular to the first rotating shaft.

21. A reaction system on centrifugal force, comprising:
a centrifugal force sensing device, comprising:
- a first rotating shaft;
- two first movable sleeves, slidingly disposed on the first rotating shaft;
- a first weight;
- two first linkages respectively having a first end and a second end, wherein the first ends of the two first linkages are connected to the first weight, and the second ends of the two first linkages are respectively connected to the two first movable sleeves;
- a restoration element, comprising a fixing block and two first damping elements, wherein the fixing block is fixed at the first rotating shaft and located between the two first movable sleeves, and the two first damping elements are disposed at the first rotating shaft and respectively located between each of the two first movable sleeves and the fixing block;
- a second weight;
- two second linkages respectively having a first end and a second end, wherein the first ends of the two second linkages are connected to the second weight, and the second ends of the two second linkages are respectively connected to the two first movable sleeves;
- two first fixing sleeves, fixed at the first rotating shaft and respectively located at the outer sides of the two first movable sleeves; and
- two fixers, fixed at the first rotating shaft and respectively located at the outer sides of the two first fixing sleeves;
- two first guiding rods, respectively fixedly connected to the fixing block, wherein the two first guiding rods are substantially parallel to the first rotating shaft, and the two first movable sleeves are slidingly disposed on the two first guiding rods;
- a first sensing unit, for sensing a centrifugal forces applied on the first weight and the second weight so as to generate first sensing information;
- a transmission element, coupled to the first sensing unit for transmitting the first sensing information; and
a reaction device on centrifugal force, comprising:
- a reception element, coupled to the transmission element so as to receive the first sensing information; and
- a reaction element, coupled to the reception element so as to generate a reaction on motion according to the first sensing information.

22. The reaction system on centrifugal force as claimed in claim 21, wherein the centrifugal force sensing device further comprises:
- a second rotating shaft, disposed through the fixing block;
- two second movable sleeves, slidingly disposed on the second rotating shaft, wherein the fixing block is located between the two second movable sleeves;
- a third weight;
- two third linkages respectively having a first end and a second end, wherein the first ends of the two third linkages are connected to the third weight, and the second ends of the two third linkages are respectively connected to the two second movable sleeves;
- two second damping elements, respectively disposed between each of the two second movable sleeves and the fixing block;
- two second fixing sleeves, fixed at the second rotating shaft and respectively located at the outer sides of the two second movable sleeves;
- a fourth weight;
- two fourth linkages respectively having a first end and a second end, wherein the first ends of the two fourth linkages are connected to the fourth weight, and the second ends of the two fourth linkages are respectively connected to the two second movable sleeves; and
- a second sensing unit, for sensing a centrifugal forces applied on the third weight and the fourth weight so as to generate second sensing information.

23. The reaction system on centrifugal force as claimed in claim 22, wherein the second rotating shaft is substantially perpendicular to the first rotating shaft.

24. The reaction system on centrifugal force as claimed in claim 22, further comprising:
- a first processing element, coupled to the first sensing unit and the second sensing unit for calculating rotation information according to the first sensing information and the second sensing information.

25. The reaction system on centrifugal force as claimed in claim 21, wherein the reaction element is one of a display unit, a vibration unit and a vocalization unit.

26. The reaction system on centrifugal force as claimed in claim 21, wherein the transmission element and the reception element are respectively a wireless transmitter and a wireless receiver.

27. A centrifugal force sensing device, comprising:
- a first rotating shaft;
- two first movable sleeves, slidingly disposed on the first rotating shaft;
- a first weight;
- two first linkages respectively having a first end and a second end, wherein the first ends of the two first linkages are connected to the first weight, and the second ends of the two first linkages are respectively connected to the two first movable sleeves;
- a restoration element, comprising a fixing block and two first damping elements, wherein the fixing block is fixed at the first rotating shaft and located between the two first movable sleeves, and the two first damping elements are disposed at the first rotating shaft and respectively located between each of the two first movable sleeves and the fixing block;
- a second weight;
- two second linkages respectively having a first end and a second end, wherein the first ends of the two second linkages are connected to the second weight, and the second ends of the two second linkages are respectively connected to the two first movable sleeves;
- two first fixing sleeves, fixed at the first rotating shaft and respectively located at the outer sides of the two first movable sleeves;

two fixers, fixed at the first rotating shaft and respectively located at the outer sides of the two first fixing sleeves;

two first guiding rods, respectively fixedly connected to the fixing block, wherein the two first guiding rods are substantially parallel to the first rotating shaft, and the two first movable sleeves are slidingly disposed on the two first guiding rods;

a first variable resistor, disposed at a side of the fixing block, wherein the first variable resistor has a first adjustment portion for adjusting the resistance of the first variable resistor;

a first swing arm, fixedly connected to the first adjustment portion;

two first driving rods having a first end and a second end, wherein the first ends of the two first driving rods are respectively connected to the two first movable sleeves, and the second ends of the two first driving rods are connected to the first swing arm;

a second rotating shaft, disposed through the fixing block and substantially perpendicular to the first rotating shaft;

two second movable sleeves, slidingly disposed on the second rotating shaft, wherein the fixing block is located between the two second movable sleeves;

a third weight;

two third linkages respectively having a first end and a second end, wherein the first ends of the two third linkages are connected to the third weight, and the second ends of the two third linkages are respectively connected to the two second movable sleeves;

two second damping elements, respectively disposed between each of the two second movable sleeves and the fixing block;

two second fixing sleeves, fixed at the second rotating shaft and respectively located at the outer sides of the two second movable sleeves;

a fourth weight;

two fourth linkages respectively having a first end and a second end, wherein the first ends of the two fourth linkages are connected to the fourth weight, and the second ends of the two fourth linkages are respectively connected to the two second movable sleeves;

two second guiding rods, respectively fixed at the fixing block, wherein the two second guiding rods are substantially parallel to the second rotating shaft, and the two second movable sleeves are slidingly disposed on the two second guiding rods;

a second variable resistor, disposed at a side opposite to the first variable resistor of the fixing block, wherein the second variable resistor has a second adjustment portion for adjusting the resistance of the second variable resistor;

a second swing arm, fixedly connected to the second adjustment portion; and two second driving rods, respectively having a first end and a second end, wherein the first ends of the two second driving rods are respectively connected to the two second movable sleeves, and the second ends of the two second driving rods are connected to the second swing arm.

* * * * *